United States Patent [19]

Cleveland

[11] Patent Number: 4,496,333
[45] Date of Patent: Jan. 29, 1985

[54] LOW FRICTION POWER TAKEOFF SHAFT
[75] Inventor: Donald C. Cleveland, Rochester, Mich.
[73] Assignee: Rockwell International Corporation, Pittsburgh, Pa.
[21] Appl. No.: 400,515
[22] Filed: Jul. 21, 1982
[51] Int. Cl.³ .............................................. F16D 3/06
[52] U.S. Cl. .................................... 464/162; 384/299
[58] Field of Search ............... 308/DIG. 7, DIG. 11; 384/295, 296, 297, 299; 403/326; 464/162, 182, 183, 901, 89

[56] References Cited

U.S. PATENT DOCUMENTS

| | | | |
|---|---|---|---|
| 2,666,677 | 1/1954 | Miller | 308/DIG. 7 |
| 2,733,968 | 2/1956 | Pelz, Jr. et al. | 384/297 X |
| 3,144,919 | 8/1964 | Foote et al. | 384/297 X |
| 4,020,651 | 5/1977 | Callies | 464/162 X |
| 4,033,020 | 7/1977 | Hudgens | 464/162 X |
| 4,045,980 | 9/1977 | Woodward et al. | 464/162 |
| 4,258,960 | 3/1981 | Harris | 384/297 |

FOREIGN PATENT DOCUMENTS 851182 10/1960 United Kingdom ....... 308/DIG. 11

Primary Examiner—Stuart S. Levy
Assistant Examiner—Daniel P. Stodola

[57] ABSTRACT

A slip bearing for a power takeoff shaft wherein a sleeve is placed between the socket and shaft of the power take off. A retaining ring, inserted in grooves formed on the inside of the shaft, is used to hold the nylon sleeve in the shaft.

1 Claim, 8 Drawing Figures

LOW FRICTION POWER TAKEOFF SHAFT

BACKGROUND OF THE INVENTION

Field of the Invention

The invention relates to power takeoff shaft slip bearings and retainers.

Related prior art disclosures are found in Class 64, Machine Elements, Shafting and Flexible Shaft Couplings, subclasses 1S and 2P; Class 74, Machine Elements and Mechanisms, subclasses 11, 12, 13, 14, 15 15.2, 15.4, 15.63, 15.66, 15.69, 15.8, 15.82, 15.84, 15.86, 15.88; Class 220, Metallic Receptacles, subclasses 319, 320, 321; Class 279, Chucks or Sockets, subclasses 19.6, 19.7; Class 308, Machine Elements, Bearings and Guides, subclasses 238, 239, Digest 7, Digest 11; and Class 403, Joints and Connections, subclasses 109, 292, 298, 300 and 359.

Examples of pertinent U.S. patents are as follows:

U.S. Pat. No. 3,070,408 shows a Teflon bushing used to support a torsion bar in the suspension system of an automobile. Sealing flanges are used to prevent dirt from entering the shaft.

U.S. Pat. No. 2,831,737 shows a nylon bearing sleeve construction which is particularly suited for use in areas where dirt and/or sand could negate the lubricating effects of the sleeve.

U.S. Pat. No. 2,913,284 shows a nylon lock bushing employed as a bearing member for movable parts. A snapped locking means is used to prevent displacement of the bushing.

U.S. Pat. No. 2,924,989 shows a jalousie operator which uses a nylon bushing for improved lubrication.

U.S. Pat. No. 3,369,378 shows a retaining ring used to prevent relative axial displacement between two members in a universal joint.

U.S. Pat. No. 3,909,920 shows a clamping ring used to retain an inner part within the bore of an outer part.

U.S. Pat. No. 4,077,232 shows a resilient split ring used to secure a circular discord member within a cylindrical member.

A need exists for a low friction power takeoff slip bearing coupling shaft which is easily assembled and, once assembled, stays assembled, in which shafts couple easily and transmit power without slipping.

SUMMARY OF THE INVENTION

The present invention provides a power takeoff slip bearing coupling which is easily assembled, which stays assembled, which has few parts, which provide ease in coupling shafts and which transmits power without slipping.

In a preferred embodiment, a low friction telecopying power takeoff shaft apparatus has a first shaft with an opening in one end. An elongated recess extending inward from the opening. An inner wall of the recess has at least a portion with a non-round cross section for receiving a second shaft having a non-round cross section. A non-round friction-reducing lower sleeve is interposed between the second shaft and the inner wall of the recess. The sleeve has an outer end spaced slightly inward from the opening. A groove extends axially outward from the inner wall. The groove is spaced axially inward from the opening. A retainer ring is positioned in the groove and extends in partially radially inward from the groove in front of at least a portion of the outer end of the sleeve for retaining the sleeve in the recess.

Preferably an outer portion of the inner wall of the recess near the opening is positioned radially outward from the non-round position of the inner wall, and wherein the groove is positioned in the outer portion.

In one embodiment the outer end of the sleeve has an outward extending flange, which is positioned in the outer portion of the recess, axially inward from the groove.

In one embodiment the outer portion of the recess has plural circumferentially spaced cavities. The flange has complementary plural circumferentially spaced lobes, which fit in the cavities of the outer portion of the recess.

Preferably the retainer ring is a split washer-like device with flat radial walls having or relatively narrow cylindrical mid-portion and having relatively axially enlarged spaced end portions with openings therein for inserting a tool to circumferentially compress the retainer ring for inserting and removing the ring.

An object of the invention is to provide an improved slip bearing for a power takeoff shaft.

Another object of the invention is to provide a non-round liner insert for a non-round recess in one shaft end to receive a non-round shaft.

A further object of the invention is the provision of a retainer ring for fitting in an internal outward extending axial groove to hold a non-round liner in a non-round recess.

The invention has as a further object the provision of a multiple lobed retainer coopering with a multiple cavity groove for holding a non-round liner in a non-round cavity.

These and other objects of the invention are apparent in the specification, claims and drawings.

DETAILED DESCRIPTION

Figure 1:
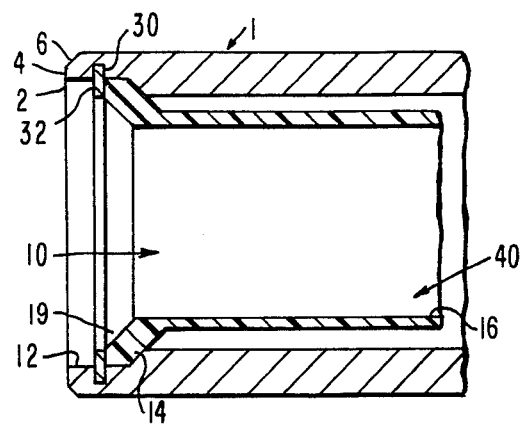
FIG. 1 is a partial, cross-sectional elevational detail of a slip bearing sleeve held in a shaft end recess by a retainer.
Figure 2:
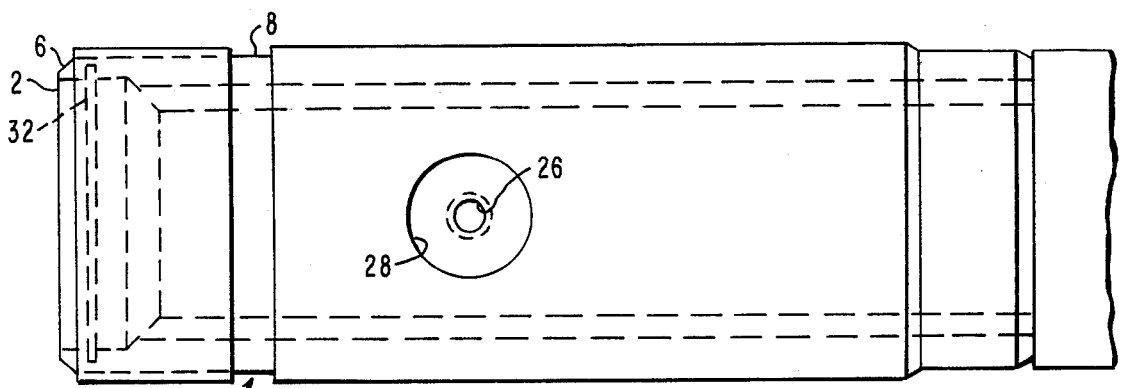
FIG. 2 is an elevation of the shaft.
Figure 3:
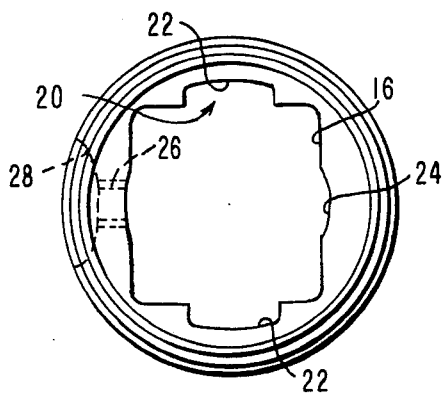
FIG. 3 is an end elevation of the shaft.
Figure 4:
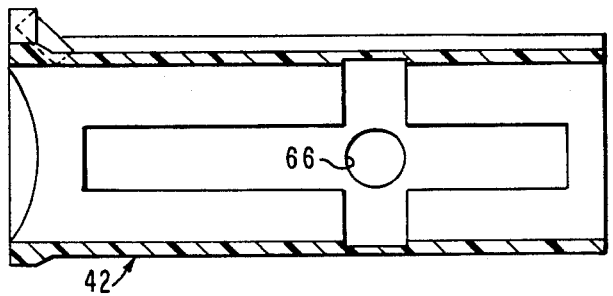
FIG. 4 is an elevation of the liner shown partially in section.
Figure 5:
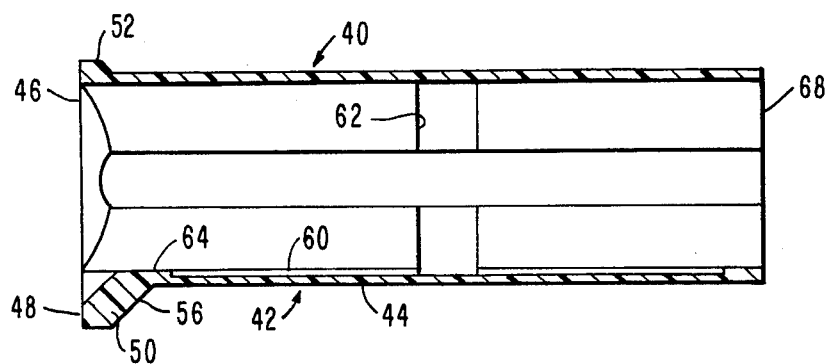
FIG. 5 is another elevation of the liner shown partially in sections.
Figure 6:
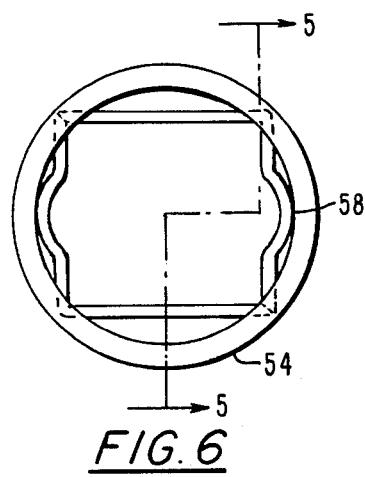
FIG. 6 is one end view of the liner.
Figure 7:
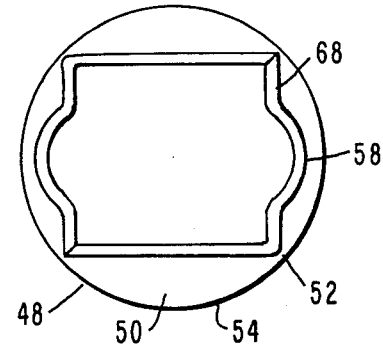
FIG. 7 is an opposite end view of the liner.

As shown in FIGS. 1–3 a power takeoff shaft 1 has an opening 2 in one end 4. An outer edge 6 is chamfered and a groove 8 is formed in an outer surface. An inner surface is formed with a recess 10 having a cylindrical vestibule and a sloping conical surface 19. A non-round, generally square portion 16 has opposite longitudinal recesses generally indicated by the numeral 20, including deep recess 22 and shallow recesses 24. A hole 26 is drilled and tapped and through the wall of shaft 1 with a counter box 28 in the outer wall.

A groove 30 in cylindrical wall 12 receives a retainer 32 which holds a liner generally indicated by the numeral 40.

Liner 40 shown in FIGS. 4–7 has a main body 42 with thin generally rectangular walls 44. One end 46 has a flange 48 with lobes 50 and narrow portions 52 which have a cylindrical outer wall 54 for lying against cylindrical wall 12 of the shaft. The lobes have sloping rear walls 56 for lying against sloping wall 14 of the shaft. Outer walls 44 of the non-round portion lie against non-round wall portion 16 of the shaft recess.

The liner body 42 has relatively large longitudinally extending opposite radial projections 58 which lie in deep recesses 22 in the shaft inner square portion wall 16, shallow longitudinal grooves 60 and transverse grooves 62 are provided in the inner wall 64 of the liner body 42, which may be made for example of glass-fiber reinforced nylon. A transverse hole 66 in the liner aligns with transverse hole 26 in the shaft 1.

The second end 68 of the liner has an opening surrounded by a thin wall.

Figure 8:
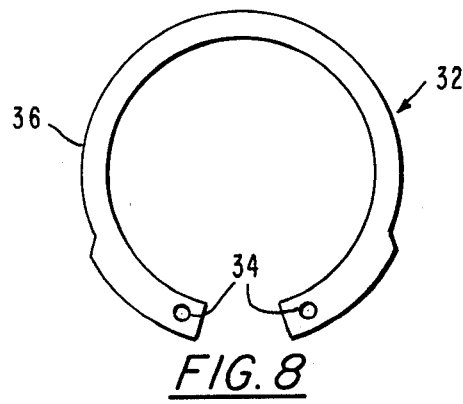
FIG. 8 is an end view of the retainer.

The liner 40 is pushed into recess 10 in shaft 1 until the sloping walls 56 of the flange lie against sloping wall 14 in the shaft. Retainer ring 32 shown in FIG. 8 is compressed by inserting prongs of a tool in openings 34 and squeezing the ring until outer surface 36 fits in cylindrical surface 12. Retainer 32 is axially aligned with groove 30 and released to expand into the groove.

A square cross-section coupling shaft not shown may be easily slid into liner 40, with ball detents in the coupling shaft aligned to fit in projections 58. When the ball detents reach hole 66 the shafts remain engaged. Alternatively the coupling shaft may have rounded lands which fit in projections 48. The lands may have recesses which align with hole 66 to receiving a retaining element fitted in hole 26 in the shaft.

While the invention has been described with reference to a specific preferred embodiment, variations and modifications are contemplated which fall within the scope of the following claims.

I claim:

1. A low friction telecopying power takeoff shaft apparatus having a first hollow shaft with an opening in one end, an inner surface having an inner wall portion defining an elongated cylindrical recess extending axially inward from the end of said first hollow shaft, the inner surface of said shaft having at least a portion with a non-round cross section adjacent said inner wall portion for receiving a second shaft having a non-round cross section, a non-round friction-reducing lower sleeve is interposed between the second shaft and the inner surface of the first shaft, said sleeve has an outer end spaced slightly axially outward from the inner surface portion with a non-round cross section, said outer end of the sleeve has a radially outwardly extending annular flange which is positioned in said recess, an annular groove provided in the inner wall portion, said groove is spaced axially between the opening and the annular flange a short distance from the end of said first shaft, a retainer ring is positioned in the groove in front of at least a portion of the annular flange to retain the sleeve in fixed position relative to the first shaft, the inner wall portion has plural circumferentially spaced cavities, the flange has complementing plural circumferentially spaced lobes, which fit in the cavities of the inner wall portion, the retainer ring is a split washer-like device with flat radial walls having a relatively narrow cylindrical mid-portion and having relatively axially enlarged spaced end portions with openings therein for inserting a tool to circumferentially compress the retainer ring for inserting and removing the ring.

* * * * *